(12) United States Patent
Ishihara et al.

(10) Patent No.: US 9,646,506 B2
(45) Date of Patent: May 9, 2017

(54) METHODS AND APPARATUS FOR MANAGING A PREMATURE DESCENT ENVELOPE DURING DESCENT OF AN AIRCRAFT

(71) Applicant: HONEYWELL INTERNATIONAL INC., Morristown, NJ (US)

(72) Inventors: Yasuo Ishihara, Kirkland, WA (US); C Don Bateman, Bellevue, WA (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/870,495

(22) Filed: Sep. 30, 2015

(65) Prior Publication Data
US 2017/0092140 A1 Mar. 30, 2017

(51) Int. Cl.
*G08G 5/02* (2006.01)
*G05D 1/06* (2006.01)
*G08G 5/00* (2006.01)

(52) U.S. Cl.
CPC ........... *G08G 5/025* (2013.01); *G05D 1/0676* (2013.01); *G08G 5/0039* (2013.01)

(58) Field of Classification Search
CPC ..... G08G 5/025; G08G 5/0039; G05D 1/0676
USPC .......................................................... 701/18
See application file for complete search history.

(56) References Cited

U.S. PATENT DOCUMENTS

| 4,567,483 | A | 1/1986 | Bateman et al. |
| 4,675,823 | A | 6/1987 | Noland |
| 4,684,948 | A | 8/1987 | Bateman |
| 5,220,322 | A | 6/1993 | Bateman et al. |
| 6,421,603 | B1 * | 7/2002 | Pratt ...................... G01C 21/00 244/175 |
| 6,445,310 | B1 | 9/2002 | Bateman et al. |
| 6,577,947 | B1 * | 6/2003 | Kronfeld ................. G01C 21/00 701/301 |
| 6,600,977 | B2 | 7/2003 | Johnson et al. |
| 6,980,892 | B1 | 12/2005 | Chen et al. |
| 7,375,678 | B2 * | 5/2008 | Feyereisen ............. G01C 23/00 342/180 |

(Continued)

FOREIGN PATENT DOCUMENTS

EP    2937846 A1    10/2015

OTHER PUBLICATIONS

Xiao, G., "Research on an EGPWS/TAWS Simulator With Forward-Looking Alerting Function," Digital Avionics System Conference, 2014.

(Continued)

*Primary Examiner* — Mcdieunel Marc
*Assistant Examiner* — James E Stroud
(74) *Attorney, Agent, or Firm* — Lorenz & Kopf, LLP

(57) ABSTRACT

A method for managing a premature descent envelope during descent of an aircraft is provided. The method receives glideslope deviation data by an instrument landing system (ILS) onboard the aircraft; compares, by the ILS, the glideslope deviation data to an acceptable band of glideslope deviation values; and when the glideslope deviation data is within the acceptable band, expands, by a terrain awareness and warning system (TAWS), the premature descent envelope to produce an increased premature descent envelope for the aircraft.

20 Claims, 4 Drawing Sheets

(56) References Cited

U.S. PATENT DOCUMENTS

| | | | |
|---|---|---|---|
| 7,965,202 B1* | 6/2011 | Chiew | G01C 23/00 |
| | | | 340/973 |
| 8,718,915 B1* | 5/2014 | Turcios | G01C 23/005 |
| | | | 342/176 |
| 9,243,910 B1* | 1/2016 | Esno | G01C 21/00 |
| 9,316,506 B2* | 4/2016 | Aspen | G01C 23/00 |
| 9,342,988 B2* | 5/2016 | Bourret | G08G 5/0086 |
| 9,390,559 B2* | 7/2016 | Feyereisen | B64D 45/00 |
| 2003/0222887 A1* | 12/2003 | Wilkins, Jr. | G01C 23/005 |
| | | | 345/618 |
| 2007/0013558 A1 | 1/2007 | Ishihara | |
| 2008/0154447 A1* | 6/2008 | Spinelli | G01C 21/20 |
| | | | 701/7 |
| 2013/0106623 A1 | 5/2013 | Ishihara et al. | |
| 2014/0100720 A1 | 4/2014 | Fleiger-Holmes et al. | |
| 2015/0307207 A1* | 10/2015 | Meunier | G08G 5/02 |
| | | | 701/4 |

OTHER PUBLICATIONS

Breen, B.C., "Controlled flight into terrain and the Enhanced Ground Proximity Warning system," Allied-Signal Commercial Avionics Syst., Redmond, WA, USA, 1997.
Ishihara, Y., "Continuing Trend of Landing Short / Premature Descent Incidents—Ways to Reduce Risk," Honeywell Aerospace, Nov. 11-13, 2014.
Ishihara, Y., "Reviewing Worldwide EGPWS Alert Statistics: Further Reducing the Risk of CFIT," Honeywell Aerospace, Oct. 2012.
Extended EP Search Report for Application No. 16190967.6-1802 dated Feb. 23, 2017.

* cited by examiner

METHODS AND APPARATUS FOR MANAGING A PREMATURE DESCENT ENVELOPE DURING DESCENT OF AN AIRCRAFT

TECHNICAL FIELD

Embodiments of the subject matter described herein relate generally to managing a premature descent envelope during descent and/or landing of an aircraft. More particularly, embodiments of the subject matter relate to increasing a premature descent envelope when the aircraft is adhering to at least a glideslope signal provided by an instrument landing system (ILS).

BACKGROUND

A pilot depends on instrumentation to conduct a safe landing of an aircraft. Instrumentation problems can lead to incorrect interpretation of the position of the aircraft, potentially resulting in an inability to land safely. One particular system that a pilot may depend on is an instrument landing system (ILS), which is used to receive glideslope signals. A false glideslope reading could lead a pilot to believe that the aircraft is descending according to a standard glide path when that is not the case. The aircraft may be flying too low to safely land, but too high to violate a standard premature descent envelope, which would generate an alert.

Accordingly, it is desirable to provide a mechanism for alerting a pilot when an aircraft is flying lower than the recommended glide path. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for managing a premature descent envelope during descent of an aircraft. The method receives glideslope deviation data by an instrument landing system (ILS) onboard the aircraft; compares, by the ILS, the glideslope deviation data to an acceptable band of glideslope deviation values; and when the glideslope deviation data is within the acceptable band, expands, by a terrain awareness and warning system (TAWS), the premature descent envelope to produce an increased premature descent envelope for the aircraft.

Some embodiments provide a system for managing a premature descent envelope during descent of an aircraft. The system includes a glideslope system, configured to detect a glideslope deviation of the aircraft from a designated glide path onto the approaching runway; system memory; and at least one processor, communicatively coupled to the system memory, the at least one processor configured to: compare the glideslope deviation to acceptable glideslope deviation values; and when the glideslope deviation is within predefined glideslope deviation values, increase altitude values of the premature descent envelope.

Some embodiments provide a non-transitory, computer-readable medium containing instructions thereon, which, when executed by a processor, perform a method. The method determines whether an aircraft is adhering to vertical guidance provided by a detected glideslope signal during descent; and when the aircraft is adhering to the vertical guidance, expands a premature descent envelope for the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for expanding a premature descent envelope, during descent, to overcome a potentially false glideslope signal received at the aircraft. The glideslope signal is determined to be potentially false when operation of the aircraft attempts to follow a recommended glide path that is based on the received glideslope signal. In certain embodiments, the glideslope signal is determined to be potentially false when operation of the aircraft is determined to adhere to the recommended combination of glideslope and localizer values. The expansion of the premature descent envelope decreases the allowable deviation from a defined glide path without producing an alert.

Figure 1:
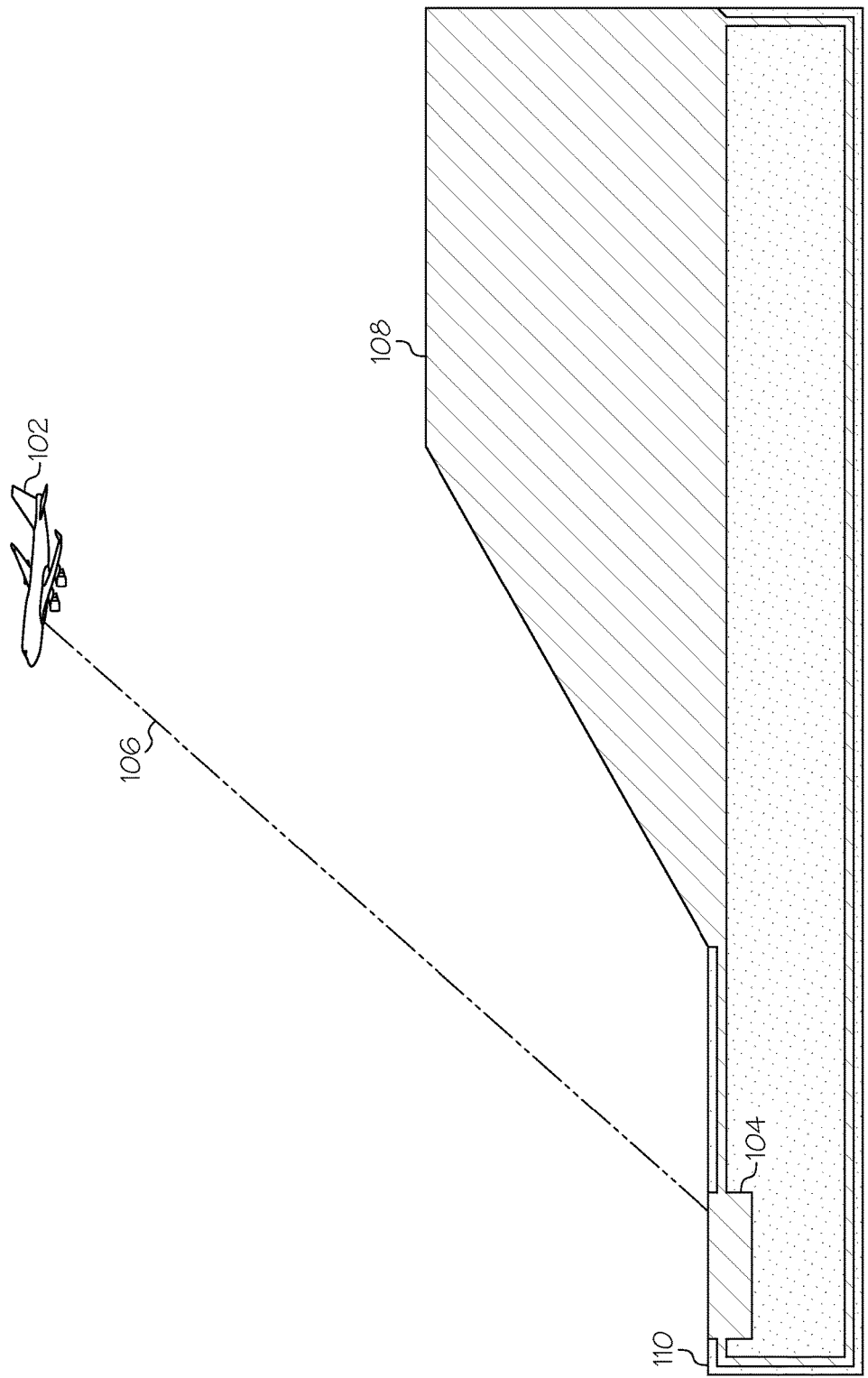
FIG. 1 is a diagram of an aircraft descending with the assistance of a landing system, in accordance with the disclosed embodiments.

Turning now to the figures, FIG. 1 is a diagram of an aircraft 102 descending with the assistance of a landing system 104, in accordance with the disclosed embodiments. The aircraft 102 may be any aircraft that includes a landing system 104, as described below, which obtains the requisite glideslope and localizer signals. Alternatively, the aircraft 102 can be any aircraft suitably configured to obtain the requisite glideslope and localizer data, via any other onboard equipment, for analysis onboard the aircraft 102.

The landing system 104 generally includes components located onboard the aircraft 102 and on the approaching runway 110, which provide horizontal and vertical guidance to the aircraft 102 during descent and landing. In exemplary embodiments, the landing system 104 is implemented as an Instrument Landing System (ILS). However, in other embodiments, the landing system 104 may be implemented as a Global Navigation Satellite System (GNSS) landing system, to include Global Positioning System (GPS), Wide Area Augmentation System (WAAS), Ground Based Augmentation System (GBAS), or National Airspace System (NAS) implementations, or any other landing system that provides vertical guidance. In practice, the landing system 104 may be implemented using any device, hardware, or system which includes equipment to receive localizer and glideslope signals, and to interpret and provide horizontal and vertical guidance based on these signals.

The glideslope signal defines a glide path 106 of approximately 3° above horizontal (i.e., ground level), for the aircraft 102 to travel to reach the runway 110 safely. Typically, the glide path angle is a value of 2.5° -3°, depending on the obstacles along the corridor of approach and the inclination of the runway 110. The glide path 106 is used in conjunction with the premature descent envelope 108 to land the aircraft 102 safely at the runway 110. The premature descent envelope 108 is a sequence of minimum clearance altitudes that the aircraft should maintain above current terrain, at particular distances from the runway. The premature descent envelope 108 is specific to each runway, and reflects the altitudes required to land safely at a particular runway based on the terrain at that runway. In certain embodiments, the data associated with the premature descent envelope 108 is stored in a database onboard the aircraft 102. In some embodiments, data associated with the premature descent envelope 108 may be accessible via wireless communication equipment onboard the aircraft 102. The premature descent envelope 108 may also be implemented as a Terrain Clearance Floor (TCF), a Runway Field Clearance Floor (RFCF), or the like.

As shown, the aircraft 102 follows the glide path 106 to the runway 110, and lands safely by adhering to the glide path 106, and thus, adhering to the altitudes of the premature descent envelope 108. As long as the aircraft 102 remains at an altitude above underlying terrain that is greater than the altitude defined by the premature descent envelope 108, the aircraft 102 can continue to descend as it approaches the runway 110 without generating alarms concerning the altitude of the aircraft 102. However, the aircraft 102 "knows" that it is travelling along the glide path 106 by interpreting a glideslope signal, and when faulty equipment or other errors onboard the aircraft 102, or external signal interference produce a false glideslope signal, the integrity of the theoretical glide path 106 may be compromised. Following a false glideslope signal, the aircraft 102 may be flying below the glide path 106, but higher than the required altitudes of the premature descent envelope 108. In this case, the aircraft 102 is flying too low to land safely at the runway 110, but too high to generate an alarm for flying below the desired altitudes of the premature descent envelope 108.

Figure 2:
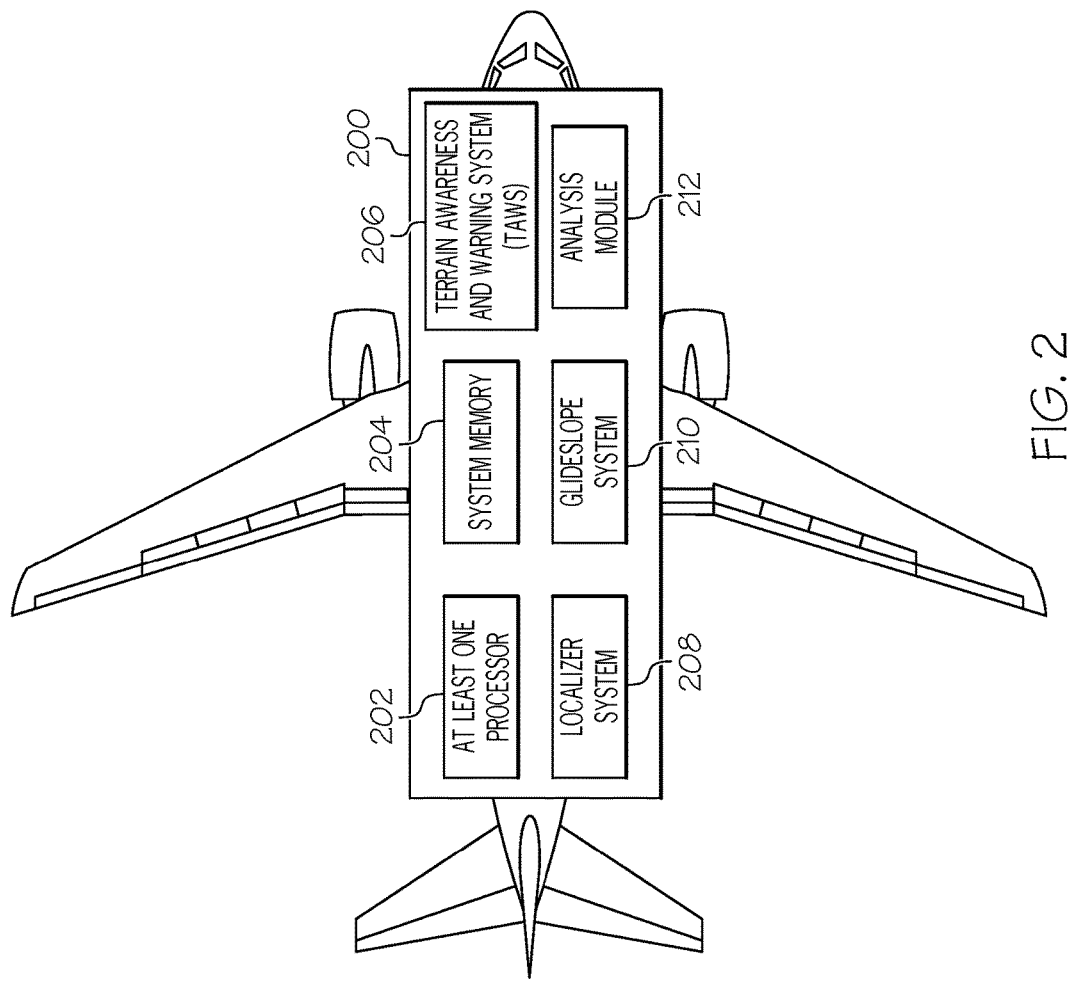
FIG. 2 is a functional block diagram of an enhanced landing system, in accordance with the disclosed embodiments.

FIG. 2 is a functional block diagram of an enhanced landing system 200, in accordance with the disclosed embodiments. An enhanced landing system 200 generally includes without limitation: at least one processor 202; system memory 204; a terrain awareness and warning system (TAWS) 206; a localizer system 208; a glideslope system 210; and an analysis module 212. These elements and features of the enhanced landing system 200 may be operatively associated with one another, coupled to one another, or otherwise configured to cooperate with one another as needed to support the desired functionality —in particular, expanding a premature descent envelope, as described herein. For ease of illustration and clarity, the various physical, electrical, and logical couplings and interconnections for these elements and features are not depicted in FIG. 2. Moreover, it should be appreciated that embodiments of the enhanced landing system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The system memory 204 may be realized using any number of devices, components, or modules, as appropriate to the embodiment. Moreover, the enhanced landing system 200 could include system memory 204 integrated therein and/or system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the enhanced landing system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The terrain awareness and warning system (TAWS) 206 monitors the height of an aircraft above ground as determined by a radar altimeter. The TAWS 206 stores these readings, calculates trends, and generates audio and/or visual alerts if the aircraft is in certain defined flying configurations, which may include, without limitation: excessive descent rate, excessive terrain closure rate, altitude loss after take-off or with a high power setting, unsafe terrain clearance, excessive deviation below glideslope, excessively steep bank angle, and/or windshear protection. In certain embodiments, the TAWS 206 is implemented using an enhanced ground proximity warning system (EGPWS). Exemplary embodiments of the EGPWS include access to a worldwide digital terrain database, usage of Global Positioning System (GPS) technology, and a terrain display which presents a visual representation of high and low points nearby the aircraft.

The TAWS 206 is further configured to determine a premature descent envelope appropriate to the aircraft, and to create an expanded premature descent envelope when a flight crew is adhering to the vertical and/or horizontal guidance provided by the glideslope system 210 or, in some embodiments, the glideslope system 210 and the localizer system 208.

The localizer system 208 provides the horizontal guidance for the aircraft. A localizer system 208 generally includes an antenna array of several pairs of directional antennas (which are located beyond the approach end of the runway) and a localizer receiver onboard the aircraft. The antenna array and the localizer receiver operate in conjunction to provide lateral guidance to the aircraft, to ensure that the aircraft is aligned with the centerline of an approaching runway during descent and landing.

The glideslope system 210 provides vertical guidance to the aircraft. Similar to the localizer, the glideslope system 210 also uses an antenna array near the runway in conjunction with a receiver onboard the aircraft. (However, the glideslope antenna array is generally located to one side of the runway touchdown area.) The glideslope signal is transmitted in a similar manner to the transmission of the localizer signal. The center of the glideslope signal is arranged to define a glide path of approximately 3° above horizontal (i.e., ground level).

The analysis module 212 is configured to evaluate data provided by the enhanced landing system 200 to determine whether the aircraft may be using vertical guidance provided by a false glideslope signal. In practice, the analysis module 212 may be implemented with (or cooperate with) the at least one processor 202 to perform at least some of the functions and operations described in more detail herein. In this regard, the analysis module 212 may be realized as suitably written processing logic, application program code, or the like.

The analysis module 212 is configured to interpret deviations in the actual performance of the aircraft from the received localizer and glideslope signals, and to determine whether those deviations are minimal and indicate that the flight crew members are operating the aircraft with the intention of flying according to the required glide path defined by the received glideslope signal. It is possible that the glideslope signal is false, due to faulty equipment, errors in the received signals, calibration errors, external signal interference, and/or other errors onboard the aircraft. When the flight crew is not using the enhanced landing system 200 for landing the aircraft, localizer deviation and glideslope deviation may be greater than when using and following guidance from the enhanced landing system 200. However, small deviations (or no deviation) from the localizer and glideslope guidance indicate that the flight crew is using and depending on the enhanced landing system 200 to land safely.

Figure 3:
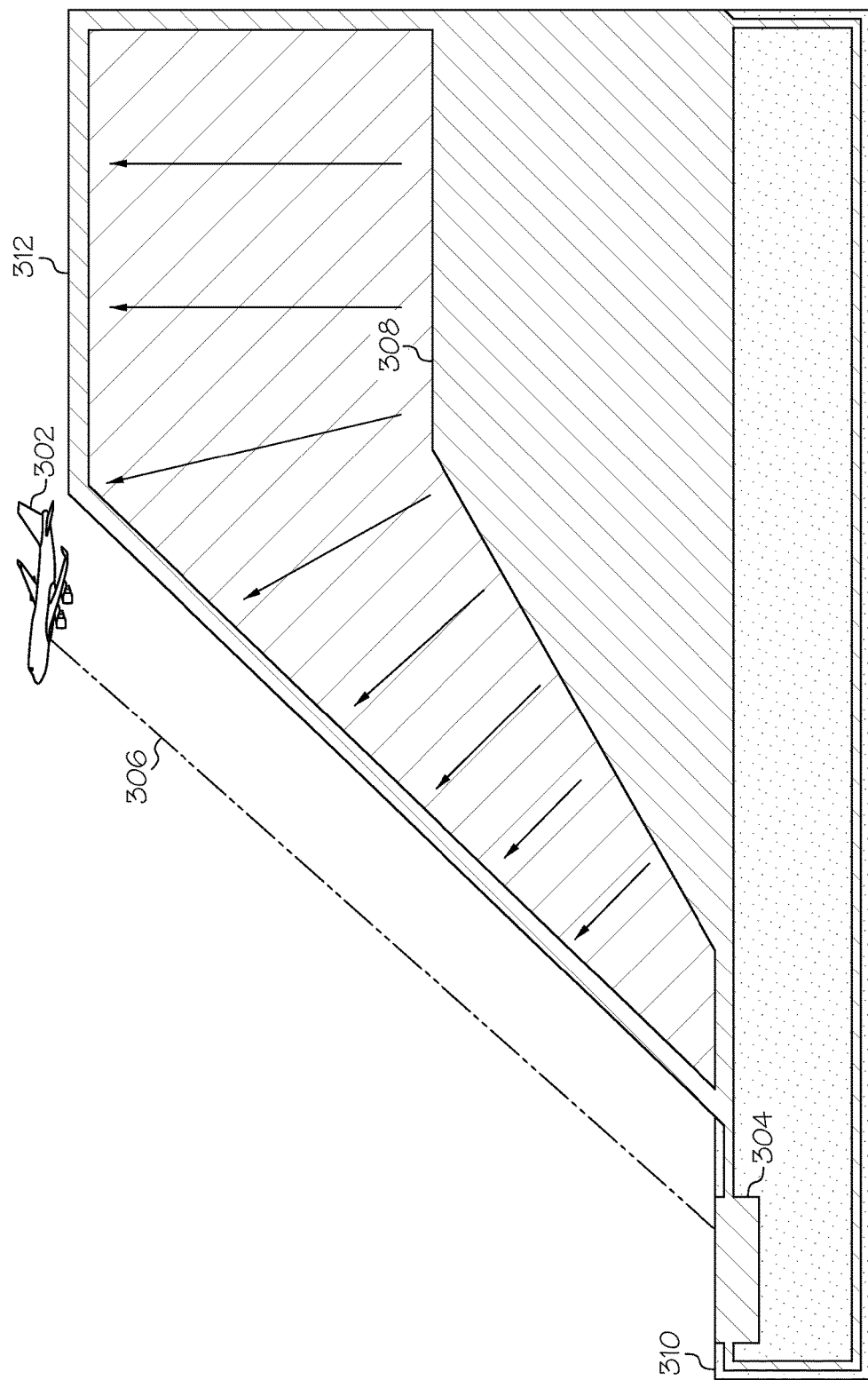
FIG. 3 is a diagram of an aircraft descending with the assistance of an enhanced landing system, in accordance with the disclosed embodiments.

The analysis module 212 is further configured to communicate this data to the TAWS 206. The TAWS 206 expands the premature descent envelope due to minimal deviations from horizontal and vertical guidance provided by the localizer system 208 and the glideslope system 210. Expansion of the premature descent envelope provides increased altitude requirements for the aircraft during descent, as shown in FIG. 3. Here, the aircraft 302 is using a landing system 304 and following a glide path 306 to land at a runway 310. The aircraft 302 may use a standard premature descent envelope 308. However, when it is determined that the aircraft is using and depending on the landing system 304 (by detecting minimal deviation from localizer and glideslope guidance), the expanded premature descent envelope 312 may be used.

The expanded premature descent envelope 312 uses increased altitudes at defined distances from the runway 310. Flying lower than the increased altitudes generates an alert. An embodiment of a standard premature descent envelope includes the following settings: the starting offset is 0.5 nautical miles (NM) from runway, the slope of the premature descent envelope is 200 ft. per NM, and the upper limit of the premature descent envelope is 300 feet. Thus, the premature descent envelope would be limited at 300 feet at a location 2 NM from the runway. The expanded premature descent envelope may include any altitude values that are increased from those of the standard premature descent envelope, up to and potentially including the maximum altitudes of the 3° glide path. An exemplary embodiment of the expanded premature descent envelope is an increased slope of 300 ft. per NM and an increased upper limit of 400 feet. The expanded premature descent envelope 312 is more "sensitive", and requires that the aircraft 302 fly very closely to the glide path 306 in order to avoid setting off onboard alarms. When the aircraft 302 receives a false glideslope signal and adheres to the resulting faulty vertical guidance, the aircraft 302 is likely to violate the requirements of the expanded premature descent envelope 312, thereby triggering an alert to let the flight crew know that the aircraft is flying too low for landing safely.

Figure 4:
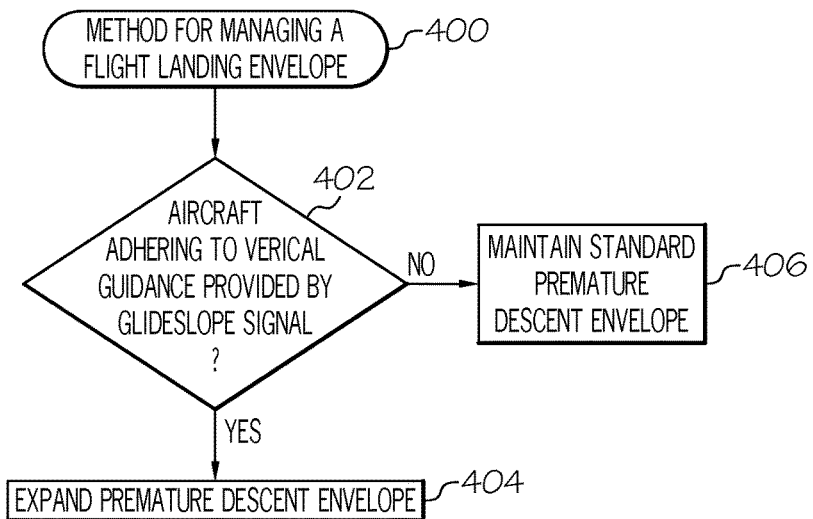
FIG. 4 is a flow chart that illustrates an embodiment of a process for managing a premature descent envelope.

FIG. 4 is a flow chart that illustrates an embodiment of a process 400 for managing a premature descent envelope. The various tasks performed in connection with process 400 may be performed by software, hardware, firmware, or any combination thereof For illustrative purposes, the following description of process 400 may refer to elements mentioned above in connection with FIGS. 1-3. In practice, portions of process 400 may be performed by different elements of the described system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, this example assumes that the process 400 begins by determining whether an aircraft is adhering to vertical guidance provided by a glideslope signal (step 402). Here, the process 400 receives glideslope deviation data or identifies a deviation from the glideslope, and compares the deviation to an acceptable band of glideslope deviation values. In exemplary embodiments, the acceptable band of glideslope deviation values may include a range of glideslope deviation values that are less than 0.2 dots. Glideslope deviation in this band is minimal, and indicates that the flight crew is attempting to follow the vertical guidance provided by the glideslope system during landing. Glideslope deviation values outside of the acceptable band are large enough to indicate that the vertical guidance provided by the glideslope system is not being used or followed by the flight crew.

When the process 400 determines that the aircraft is not following the vertical guidance provided by the glideslope signal (the "No" branch of 402), then the process 400 maintains a standard premature descent envelope for the aircraft (step 406). However, when the process 400 determines that the aircraft is following the vertical guidance provided by the glideslope signal (the "Yes" branch of 402), then the process 400 expands the premature descent envelope (step 404). Glideslope deviation is determined based on a received glideslope signal and current operation of the aircraft. Here, the glideslope deviation is within the acceptable band and, because the glideslope deviation is minimal, the aircraft is determined to be following the vertical guidance provided by the glideslope signal. In this situation, the process 400 assumes that the aircraft is intentionally being flown to minimize glideslope deviation, and that the pilot intends to follow the typically 3° slope of the glide path.

The expanded envelope is more sensitive, and includes increased altitudes that the aircraft must use to land safely at a particular runway based on the terrain at that runway. Because the glideslope signal may be false, the vertical guidance based on the glideslope signal may instruct the aircraft to fly lower than the glide path required for safe landing. Here, the premature descent envelope is expanded to provide an environment that triggers alarm at higher altitude. If, while adhering to the vertical guidance provided by the glideslope signal, the aircraft flies lower than the required altitudes of the expanded envelope (i.e., beneath the increased altitudes defined by the expanded envelope), then an alert is generated.

Figure 5:
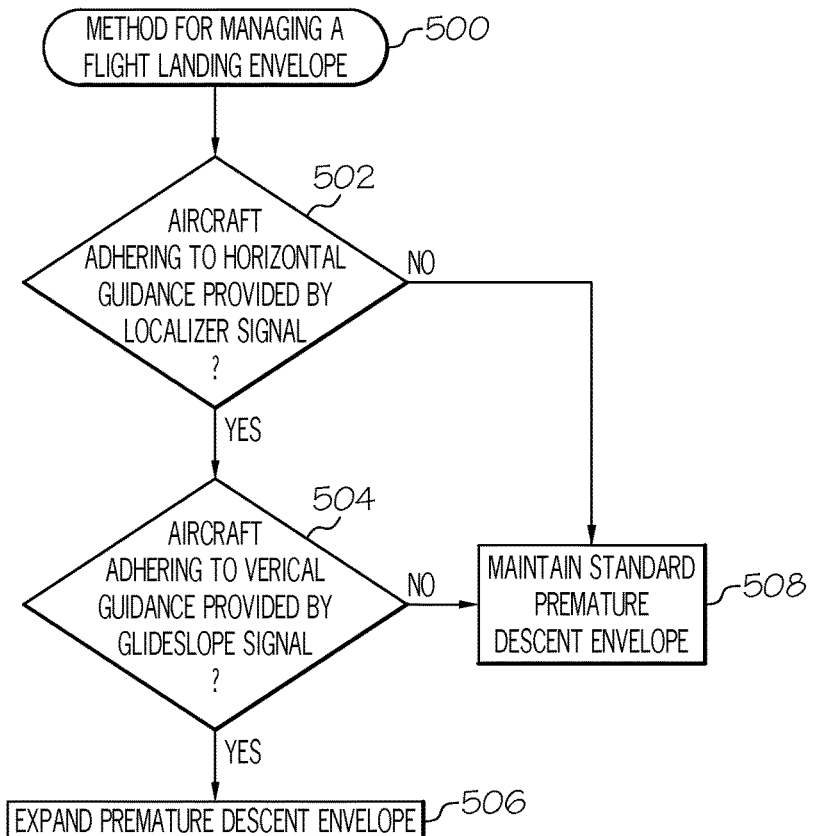
FIG. 5 is a flow chart that illustrates another embodiment of a process for managing a premature descent envelope.

FIG. 5 is a flow chart that illustrates another embodiment of a process 500 for managing a premature descent envelope. In this particular embodiment, the process 500 uses localizer deviation and glideslope deviation values to determine whether the aircraft is adhering to the horizontal and vertical guidance provided by the aircraft landing system, and to expand the premature descent envelope when it is determined that the aircraft is using the horizontal and vertical guidance. First, the process 500 determines whether the aircraft is following the horizontal guidance provided by the localizer system (step 502). Here, the process 500 receives localizer deviation data or identifies a deviation from the localizer signal, and compares this localizer deviation to an acceptable band of localizer deviation values. In exemplary embodiments, the acceptable band of localizer deviation values may include a range of localizer deviation values that are less than 0.2 dots. Localizer deviation in this band is minimal, and indicates that the flight crew is attempting to follow the horizontal (i.e., lateral) guidance provided by the localizer during landing. Localizer deviation values outside of the acceptable band are large enough to indicate that the horizontal guidance provided by the localizer is not being used or followed by the flight crew.

When the process 500 determines that the aircraft is not following the horizontal guidance provided by the localizer signal (the "No" branch of 502), then the process 500 maintains a standard premature descent envelope for the aircraft (step 508). However, when the process 500 determines that the aircraft is following the horizontal guidance provided by the localizer signal (the "Yes" branch of 502), then the process 500 performs the process described above with regard to FIG. 4, in which it is determined whether the aircraft is adhering to the vertical guidance provided by the glideslope signal (decision 504) and, when the aircraft is determined to be following this vertical guidance (the "Yes" branch of 504), expanding the premature descent envelope (step 506).

Localizer deviation is determined based on a received localizer signal and current operation of the aircraft. The acceptable band of localizer deviation values is minimal and, when the localizer deviation is within the acceptable band, the aircraft is determined to be following the horizontal (i.e., lateral) guidance provided by the localizer signal. In this situation, the process 500 assumes that the aircraft is intentionally being flown to minimize localizer deviation.

In this particular embodiment, both the localizer and glideslope signals are used to determine whether the premature descent envelope is expanded. Here, the process 500 uses two systems, instead of the glideslope alone, to confirm that the flight crew is using and following the aircraft instrumentation, and thus depending on the instrumentation in order to land safely. Thus, as compared to process 400 presented in FIG. 4, more stringent requirements are met prior to expanding the premature descent envelope.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for managing a premature descent envelope during descent of an aircraft, the method comprising:
receiving glideslope deviation data by an instrument landing system (ILS) onboard the aircraft;
comparing, by the ILS, the glideslope deviation data to an acceptable band of glideslope deviation values; and
when the glideslope deviation data is within the acceptable band,
determining that the aircraft is flying according to horizontal guidance and vertical guidance provided by the ILS; and
accommodating a potentially false glideslope signal, by:
expanding, by a terrain awareness and warning system (TAWS), the premature descent envelope to produce an increased premature descent envelope for the aircraft,
wherein the premature descent envelope comprises a set of minimum clearance altitudes for the aircraft at particular distances from the runway, wherein the increased premature descent envelope comprises a second set of increased minimum clearance altitudes at the particular distances from the runway, and wherein the increased minimum clearance altitudes comprise higher altitude values than the minimum clearance altitudes; and
when the aircraft flies below one of the increased minimum clearance values, generating an alert.

2. The method of claim 1, further comprising:
receiving localizer deviation data by the ILS;
comparing, by the ILS, the localizer deviation data to a second acceptable band of localizer deviation values; and
wherein the increased premature descent envelope is produced by the TAWS when the glideslope deviation data is within the acceptable band and the localizer deviation data is within the second acceptable band.

3. The method of claim 2, further comprising:
when the localizer deviation data is outside of the second acceptable band and the glideslope deviation data is outside of the acceptable band,
determining, by the ILS, that the aircraft is not flying according to horizontal guidance provided by a localizer signal and vertical guidance provided by a glideslope signal; and
maintaining, by the TAWS, the premature descent envelope.

4. The method of claim 1, further comprising:
when the glideslope deviation data is within the acceptable band,
determining, by the ILS, that the aircraft is flying according to vertical guidance provided by a glideslope signal;
wherein the increased premature descent envelope is produced by the TAWS to decrease allowable deviation from a defined glide path without producing an alert.

5. The method of claim 4, further comprising:
when the glideslope deviation data is outside of the acceptable band,
determining, by the ILS, that the aircraft is not flying according to the vertical guidance provided by the glideslope signal; and
maintaining, by the TAWS, the premature descent envelope.

6. The method of claim 1, further comprising:
determining, by the ILS, whether the aircraft is flying below increased altitude values defined by the increased premature descent envelope; and
when the aircraft is flying below the increased altitude values, generating an alert.

7. A system for managing a premature descent envelope during descent of an aircraft, the system comprising:
a glideslope system, configured to detect a glideslope deviation of the aircraft from a designated glide path onto the approaching runway;
system memory; and
at least one processor, communicatively coupled to the system memory, the at least one processor configured to:
compare the glideslope deviation to acceptable glideslope deviation values;
determine that the aircraft is flying according to horizontal guidance and vertical guidance provided by the ILS, and
accommodate a potentially false glideslope signal, by:
when the glideslope deviation is within predefined glideslope deviation values, increasing altitude values of the premature descent envelope;

wherein the premature descent envelope comprises a set of minimum clearance altitudes for the aircraft at particular distances from the runway, wherein the increased premature descent envelope comprises a second set of increased minimum clearance altitudes at the particular distances from the runway, and wherein the increased minimum clearance altitudes comprise higher altitude values than the minimum clearance altitudes; and when the aircraft flies below one of the increased minimum clearance values, generating an alert.

8. The system of claim 7, further comprising:
a localizer system, configured to detect a localizer deviation of the aircraft from a centerline of an approaching runway;
wherein the at least one processor is further configured to increase the altitude values of the premature descent envelope when:
  the localizer deviation is within predefined localizer deviation values; and
  the glideslope deviation is within predefined glideslope deviation values.

9. The system of claim 8, wherein the localizer deviation is within the predefined localizer deviation values when the localizer deviation is less than 0.2 dots.

10. The system of claim 8, wherein, when the localizer deviation is not within predefined localizer deviation values, the at least one processor is further configured to:
  determine that the aircraft is not being flown to minimize the localizer deviation and the glideslope deviation; and
  maintain the premature descent envelope.

11. The system of claim 7, wherein, when the glideslope deviation is within predefined glideslope deviation values, the at least one processor is further configured to:
  determine that the aircraft is being flown to minimize the glideslope deviation;
  wherein the altitude values of the premature descent envelope are increased to decrease allowable deviation from the designated glide path without producing an alert.

12. The system of claim 7, wherein, when the glideslope deviation is not within predefined glideslope deviation values, the at least one processor is further configured to:
  determine that the aircraft is not being flown to minimize glideslope deviation; and
  maintain the premature descent envelope.

13. The system of claim 7, wherein the glideslope deviation is within the predefined glideslope deviation values when the glideslope deviation is less than 0.2 dots.

14. The system of claim 7, wherein, after increasing altitude values of the premature descent envelope, the at least one processor is further configured to:
  determine whether the aircraft is flying below the increased altitude values; and
  when the aircraft is flying below the increased altitude values, generate an alert.

15. A non-transitory, computer-readable medium containing instructions thereon, which, when executed by a processor, perform a method comprising:
  determining whether an aircraft is adhering to vertical guidance provided by a detected glideslope signal during descent; and
  when the aircraft is adhering to the vertical guidance,
    determining that the aircraft is flying according to horizontal guidance and vertical guidance provided by the ILS; and
    accommodating a potentially false glideslope signal, by:
      expanding a premature descent envelope for the aircraft:
      wherein the premature descent envelope comprises a set of minimum clearance altitudes for the aircraft at particular distances from the runway, wherein the increased premature descent envelope comprises a second set of increased minimum clearance altitudes at the particular distances from the runway, and wherein the increased minimum clearance altitudes comprise higher altitude values than the minimum clearance altitudes; and
      when the aircraft flies below one of the increased minimum clearance values, generating an alert.

16. The non-transitory, computer-readable medium of claim 15, wherein the method further comprises:
  determining a glideslope deviation, based on the detected glideslope signal and current operation of the aircraft;
  comparing the glideslope deviation to a predefined set of acceptable glideslope deviation values; and
  when the glideslope deviation is in the predefined set, determining that the aircraft is adhering to the vertical guidance.

17. The non-transitory, computer-readable medium of claim 15, wherein the method further comprises:
  determining whether the aircraft is adhering to horizontal guidance provided by a localizer signal; and
  expanding the premature descent envelope when the aircraft is adhering to the vertical guidance and the horizontal guidance.

18. The non-transitory, computer-readable medium of claim 17, wherein the method further comprises:
  determining a localizer deviation, based on the localizer signal and current operation of the aircraft;
  comparing the localizer deviation to a second predefined set of acceptable localizer deviation values; and
  when the localizer deviation is in the second set, determining that the aircraft is adhering to the horizontal guidance.

19. The non-transitory, computer-readable medium of claim 15, wherein the method further comprises:
  when the aircraft is not adhering to the vertical guidance, maintaining the premature descent envelope for the aircraft.

20. The non-transitory, computer-readable medium of claim 15, further comprising:
  determining whether the aircraft is flying below increased altitude values that are indicated by the increased premature descent envelope; and
  when the aircraft is flying below the increased altitude values, generating an alert.

* * * * *